April 28, 1925. Re. 16,053

J. HADFIELD, JR

STOCKING AND PROCESS OF MAKING SAME

Original Filed March 5, 1920

Inventor-
John Hadfield, Jr.
by his Attorneys
Abram & Abram.

Reissued Apr. 28, 1925. Re. 16,053

UNITED STATES PATENT OFFICE.

JOHN HADFIELD, JR., OF PHILADELPHIA, PENNSYLVANIA.

STOCKING AND PROCESS OF MAKING SAME.

Original No. 1,444,684, dated February 6, 1923, Serial No. 363,450, filed March 5, 1920. Application for reissue filed May 26, 1923. Serial No. 641,729.

*To all whom it may concern:*

Be it known that I, JOHN HADFIELD, Jr., a citizen of the United States, residing in Philadelphia, Pennsylvania, have invented certain new and useful Improvements in Stockings and Processes of Making Same, of which the following is a specification.

My invention relates to improvements in stockings and processes for making the same, and the object of my invention is to provide a new process for forming stockings of the type known as full fashioned, whereby a great saving is achieved both in time and in the cost of manufacture, and an article of superior quality obtained.

The present method of forming stockings of the type known as full fashioned is to knit the entire leg portion upon what is commonly known as a full fashioned stocking knitting machine. This is a comparatively lengthy process, due in part to the fact that in forming the welt, the upper portion of the stocking must be turned over by hand.

During the time that the welt is being formed, it is necessary that the machine upon which the stocking is being formed remain idle, and since the knitting and turning of the upper portion of the stocking consumes substantially three-fourths of the time required to form the entire leg, it is apparent that the actual loss is considerable. All this will be fully understood and appreciated by those acquainted with the art.

I have discovered that by forming the upper portion of the leg of my stocking upon a circular stocking knitting machine of the type employed in the manufacture of so-called seamless hosiery, and transferring this upper portion of the stocking from the seamless machine to the full fashioned machine for completion of the lower portion of the leg, I am able to obtain a considerable saving both in time and actual cost of manufacture, and at the same time put out an article which is superior to the stocking formed entirely upon the full fashioned machine.

Figure 1:
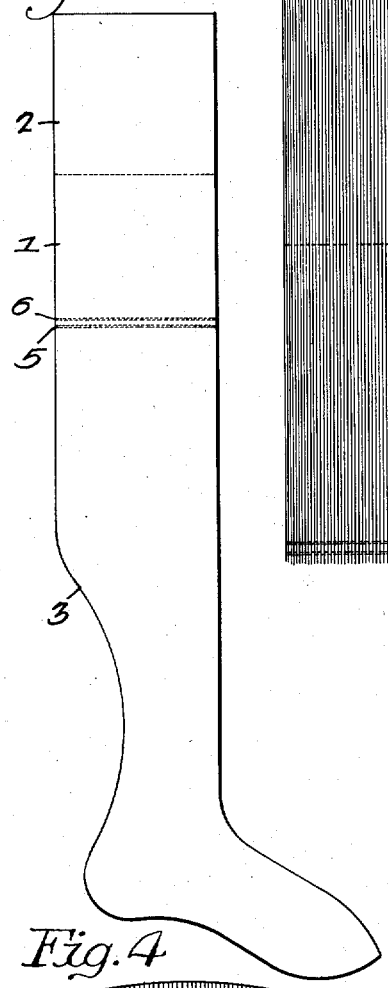
Figure 1, illustrates a stocking made in accordance with my invention.
Figure 3:
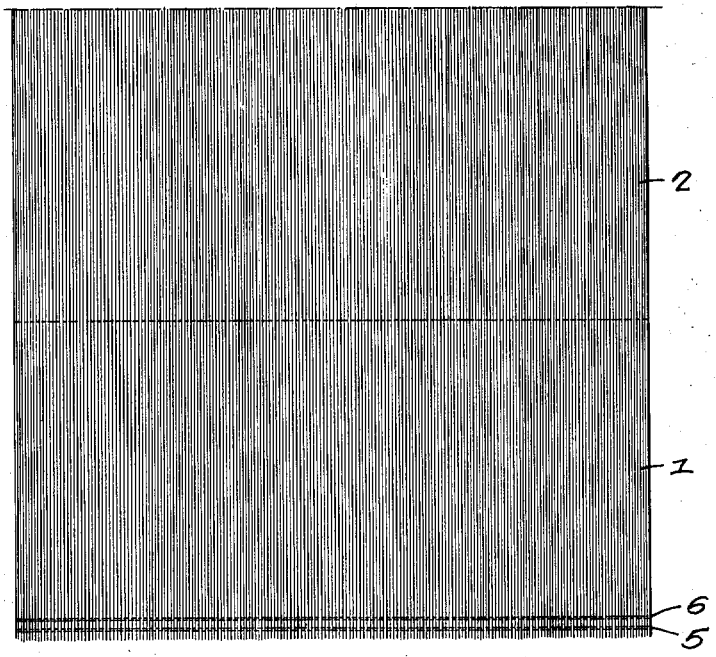
Fig. 3, is a view of the upper portion of the stocking shown in Fig. 2, after it has been divided at the rear and is ready for transference to the full fashioned knitting machine.
Figure 2:
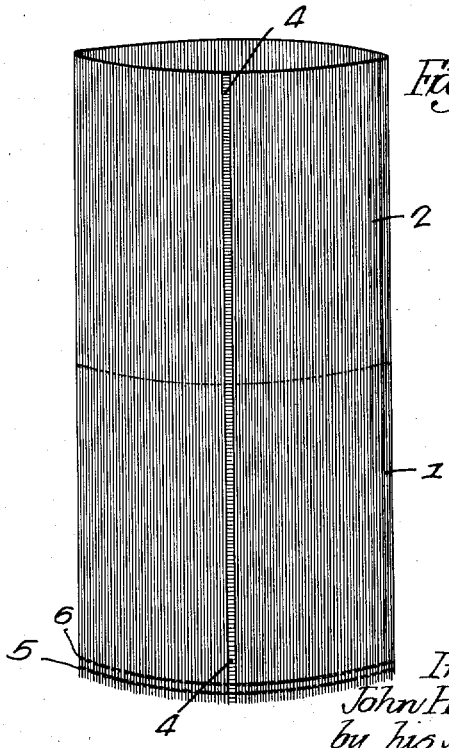
Fig. 2, shows the upper portion of the stocking, the forming of which constitutes the first step in my process.
Figure 4:
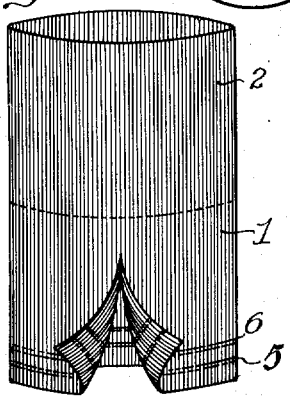
Fig. 4 is a view of the upper portion of the stocking divided in part sufficiently to permit the laying out of the lower section for the transfer operation.

In carrying out my process, it is necessary, first, that the circular machine employed in knitting the top of the stocking shall have the same number of needles as the full fashioned machine employed for knitting the lower portion of the leg, and that the two machines shall knit fabrics which in appearance are similar. This can be easily arranged for. In following out the process, therefore, I first form upon the said circular knitting machine a tubular blank 1, such as shown in Fig. 2. This knitting machine, in forming the upper portion of the stocking, automatically forms the welt 2, and after the blank is received from the machine, it is only necessary to divide the same at one side before it may be transferred to the full fashioned machine for the knitting of the shaped lower portion 3 of the leg. In order to provide a guide for the operator who cuts the tubular blanks, a stitch may be dropped at one side, or a longitudinal wale or other guide line formed, as indicated in the drawings by the numeral 4. After the tubular blank has been opened, as shown in Fig. 3, it is ready to be transferred to the full fashioned knitting machine upon which the lower portion 3 of the leg is formed as a fashioned flat-knit web, and a loose course or transfer line 5 formed in the blank constitutes a guide whereby the transfer may be swiftly and accurately made. In the transfer, all the stitches or loops at the lower edge of the circular knit blank are passed onto the needles of the flat machine, the juncture between the two leg sections of the finished article being uniform.

The upper portion of the stocking which is formed upon the said circular machine is substantially similar to the corresponding upper portion of a stocking knitted upon the full fashioned machine, since the most important shaping of the leg done upon a full fashioned machine is upon the lower portion of the leg. The stocking therefore obtained by my process is, in the essential features, exactly similar to the stocking knitted wholly upon the full fashioned machine. There are, however, certain particulars in which a stocking made in accordance with my invention is superior to the ordinary full fashioned stocking. One of the main difficulties experienced in the manufacture of seamless hosiery is the fact that in order to obtain proper relative proportions in the lower portion of the leg which lies around the ankle and in the extreme upper portion of the leg, it is necessary to limit the circumference of the upper portion of the leg. If this upper portion of the leg is made larger than is ordinarily the custom, the ankle must be correspondingly enlarged, and a stocking which bags around the ankle results. Even in full fashioned stockings of the usual type, there is as a rule insufficient provision made at this point, and the stockings are frequently found to bind the wearer at the top. It is, in fact, extremely hard to find a stocking which will meet all requirements, and a happy mean is in most cases the best that can be realized. It is a fact, however, that although the circular knitting machine employed for forming the upper part of my stocking has the same number of needles as the full fashioned machine which forms the lower portion thereof, and though the fabrics of plain knitting formed upon the two machines are apparently identical, yet the upper portion of the leg of a stocking made in accordance with my invention has a greater stretch and can encompass a greater area than a stocking knit in its entirety upon the full fashioned machine employed to form the lower portion of the leg of my stocking. This difference in apparently identical fabrics is due for most part to the needles used in the two machines, the circular machine of the type best adapted for practicing the present invention using latch needles and the flat machines using spring beard. As a consequence, I obtain a stocking which is capable of wider application and more general use than the stocking formed complete upon the full fashioned machine.

If still further flexibility is required, moreover, it is possible upon the circular knitting machine to form the inside of the welt of a fabric less closely knit than that of the rest of the stocking, and this will afford even greater flexibility to the welt while not detracting from the appearance of the stocking. Furthermore, in transferring the upper portion 1 of the stocking to the full fashioned machine, it is unnecessary to slit the blank completely open, it being sufficient to slit the blank for example from the bottom up as far as the welt only, the welt being left intact. In this event, there will be found in my stocking an actually greater number of stitches than in a full fashioned stocking, the leg of which is formed complete upon the full fashioned machine employed to knit the lower portion of the leg of my stocking, since in stitching up the back of the open blank, a number of stitches is of necessity sacrificed. Actually greater width may thus be obtained at the top of the stocking.

I am able, furthermore, in my stocking to take advantage of the so-called lock stitch or anti-run-back, which is a stitch formable only upon circular machines such as I employ in forming the upper portion of my stocking. This lock stitch is placed somewhere below the welt, as indicated in the drawings by the numeral 6, the purpose being to prevent any runs which may start from injuries caused by a garter from advancing further down the leg than the position of the said lock stitch. This is a decided advantage, particularly in silk hose, and the full fashioned stocking made in the usual manner is unable to include this feature. I am able, however, to form the said lock stitch in the upper portion of the stocking which is formed upon the circular machine, and as a consequence, it is incorporated in my completed full fashioned stocking.

Many other possible advantageous features will present themselves to those acquainted with the art.

As indicative of the great saving of time resulting from my process, I am able to form the leg of my stocking complete in approximately two-thirds of the time that it takes to form the leg of a stocking upon a full fashioned machine, this saving constituting the difference in the time that it takes to form the upper portion of the stocking upon the respective machines. I am also able to avoid in the formation of my stocking considerable close and arduous work upon the part of the operator, and the machine-formed welt is generally of superior quality to the welt formed manually upon the full fashioned machine.

Aside from the actual saving in time and labor thus described, I am able to operate my machines practically continuously, without the necessity for keeping them idle for protracted periods, and the production is thereby greatly increased, this actual increase of production being approximately 100%. In fact, I obtain this greatly increased production at an actual cost of manufacture which is less per article than in the ordinary process of manufacture.

Since the seamless knitting machines are comparatively cheap and easy to obtain, my process will particularly recommend itself to manufacturers desiring to increase their production while being unable or unwilling to go to the expense of purchasing more of the full fashioned machinery.

The expression "fashioned flat-knit web" appearing in the claims is to be understood as applying to webs knit on the flat or full-fashioned stocking machines, or to webs the fashioning of which is accomplished by transferring stitches after the method used in these machines.

I claim:

1. The method of manufacturing fashioned hosiery, which comprises forming an upper part of the leg as a circular knit web including a welt and with at least the lower section thereof open along a longitudinal line, and adding to said open lower section a fashioned flat knit web constituting a lower leg portion.

2. The method of manufacturing fashioned hosiery, which comprises forming an upper part of the leg as a circular knit web including an automatically formed welt and with at least the lower section thereof open along a longitudinal line, and adding to said open lower section a fashioned flat-knit web constituting a lower leg portion.

3. The method of producing fashioned hosiery, which comprises forming an upper portion of the leg including an automatically formed welt as a circular-knit web open along a longitudinal line, adding thereto a fashioned flat-knit web constituting a lower leg portion, and joining the longitudinal edges of the combined web to form the tubular leg.

4. The method of producing fashioned hosiery, which comprises forming an upper portion of the leg including the welt as a tubular web divided longitudinally at least in part, laying out the lower section of said web in a substantially straight line, and continuing the leg as a fashioned flat-knit web from said lower section.

5. The method of forming fashioned hosiery, which comprises knitting an upper portion of the leg including the welt as a tubular web, cutting the web to permit laying out the lower section thereof in a substantially straight line, and continuing the leg as a fashioned flat-knit web from said lower section.

6. The method of producing fashioned hosiery, which comprises knitting an upper portion of the stocking as a tubular web divided longitudinally at least in part, laying out the lower section in a substantially straight line, and continuing the leg from said lower section as a fashioned flat-knit web of the same character of knitting as the said tubular web.

7. As a new article of manufacture, an independent unit of circular knit fabric constituting the upper part of the leg of a stocking and terminating not lower than the calf, said unit having a welt at the top and being divided longitudinally at least at the lower end.

8. As a new article of manufacture, an independent unit of circular knit fabric constituting the upper part of the leg of a stocking and terminating not lower than the calf, said unit having at the top an automatically formed welt and being divided longitudinally at least at the lower end.

9. The method of manufacturing fashioned hosiery, which comprises forming an upper part of the leg as a circular knit web including a welt and with at least the lower section thereof open along a longitudinal line, and adding to said open lower section by means of a juncture that is uniform in all parts and in thickness substantially the same as the stocking fabric adjacent said juncture a fashioned flat knit web constituting a lower leg portion.

JOHN HADFIELD, Jr.